(12) United States Patent
Forster

(10) Patent No.: US 6,778,088 B1
(45) Date of Patent: Aug. 17, 2004

(54) DEPLOYABLE IDENTIFICATION DEVICE

(75) Inventor: Ian J. Forster, Essex (GB)

(73) Assignee: Marconi Intellectual Property (US) Inc., Itasca, IL (US)

( * ) Notice: Subject to any disclaimer, the term of this patent is extended or adjusted under 35 U.S.C. 154(b) by 0 days.

(21) Appl. No.: 09/502,315

(22) Filed: Feb. 11, 2000

(51) Int. Cl.[7] .................................................. G08B 13/14
(52) U.S. Cl. ................... 340/572.8; 340/572; 340/505; 340/539; 340/584; 340/589; 340/825.54
(58) Field of Search ............................... 340/572, 572.8, 340/825.54, 539, 505, 584, 589

(56) References Cited

U.S. PATENT DOCUMENTS

| | | | |
|---|---|---|---|
| 3,787,993 A | | 1/1974 | Lyon ........................... 40/306 |
| 4,630,044 A | * | 12/1986 | Polzer .................... 340/825.72 |
| 4,651,137 A | * | 3/1987 | Zartman ................... 340/573.3 |
| 4,744,162 A | * | 5/1988 | Okazaki ...................... 40/312 |
| 4,862,160 A | | 8/1989 | Ekchian et al. .......... 340/825.54 |
| 5,021,767 A | * | 6/1991 | Fockens et al. ............. 340/572 |
| 5,057,844 A | * | 10/1991 | Rothstein ...................... 342/51 |
| 5,151,684 A | * | 9/1992 | Johnsen ....................... 340/572 |
| 5,326,939 A | * | 7/1994 | Schafer ....................... 177/139 |
| 5,448,220 A | * | 9/1995 | Levy ........................... 340/539 |
| 5,524,750 A | * | 6/1996 | Miller ......................... 206/767 |
| 5,621,913 A | * | 4/1997 | Tuttle et al. .................. 455/90 |
| 5,631,631 A | | 5/1997 | Deschenes .................. 340/572 |
| 5,648,765 A | * | 7/1997 | Cresap et al. .......... 340/825.35 |
| 5,767,772 A | | 6/1998 | Lemaire et al. ............. 340/571 |
| 5,779,839 A | * | 7/1998 | Tuttle et al. ................. 156/213 |
| 5,781,112 A | * | 7/1998 | Shymko et al. ............. 340/572 |
| 5,798,693 A | | 8/1998 | Engellenner ................ 340/505 |
| 5,831,531 A | | 11/1998 | Tuttle ......................... 340/572 |
| 5,842,118 A | * | 11/1998 | Wood, Jr. ............... 340/825.54 |
| 5,865,339 A | | 2/1999 | Carlson ....................... 220/694 |
| 5,883,376 A | | 3/1999 | Rosch et al. ................ 235/492 |
| 5,887,176 A | | 5/1999 | Griffith et al. .............. 395/750 |
| 5,936,523 A | | 8/1999 | West ......................... 340/545.6 |
| 5,947,256 A | * | 9/1999 | Patterson .................... 340/572 |
| 5,953,682 A | * | 9/1999 | McCarrick et al. ......... 340/626 |
| 5,972,156 A | | 10/1999 | Brady et al. ................ 156/280 |
| 6,023,244 A | | 2/2000 | Snygg et al. ................ 343/700 |
| 6,031,459 A | * | 2/2000 | Lake ....................... 340/572.8 |
| 6,138,058 A | * | 10/2000 | Van Antwerp, Jr. et al. 340/572 |
| 6,147,604 A | * | 11/2000 | Wiklof et al. ............ 340/572.1 |

FOREIGN PATENT DOCUMENTS

| | | |
|---|---|---|
| DE | 44 46 203 A1 | 6/1996 |
| DE | 295 04 712 U | 7/1996 |
| DE | 197 03 819 C1 | 8/1998 |
| DE | 197 03 819 C | 8/1998 |
| FR | 2681972 A | 4/1993 |
| GB | 974 249 A | 11/1964 |
| GB | 2 092 096 A | 8/1982 |
| GB | 2 210 349 A | 6/1989 |
| GB | 2 293 588 A | 4/1996 |
| WO | WO 94/05090 | 3/1994 |
| WO | WO 95/15622 | 6/1995 |
| WO | WO 99/18000 | 4/1999 |

* cited by examiner

*Primary Examiner*—Jeffery Hofsass
*Assistant Examiner*—Hung Nguyen
(74) *Attorney, Agent, or Firm*—Withrow & Terranova PLLC

(57) ABSTRACT

An identification device for mounting within a container that includes a chamber positioned within an interior section and an access opening within an outer surface of the container and in communication with the chamber. The identification device includes a wireless communication device and a mounting unit. The mounting unit is positioned around the wireless communication device and is selectively positionable from a first orientation in which the wireless communication device and mounting unit are sized to extend through the access opening and a second expanded orientation larger than the width of the access opening. The invention also includes a monitoring system having at least one interrogation point for communicating with the identification device.

26 Claims, 6 Drawing Sheets

DEPLOYABLE IDENTIFICATION DEVICE

BACKGROUND OF THE INVENTION

The present invention relates generally to a device for monitoring the location of a container and, more particularly, to a wireless communication device having a protective housing that is deployable from a first orientation to an enlarged second orientation.

BACKGROUND OF THE INVENTION

It is often necessary to monitor the location and movement of materials within a distribution center or manufacturing facility. One method of tracking the materials is to attach a wireless communication device such as a radio frequency identification (RFID) transponder or other identification device to containers that are housing the materials. By way of example, a liquid container such as a barrel or keg may include an identification device indicative of the liquid contained inside. An interrogation reader, or series of receivers, having an antenna device and able to send information remotely through electronic signals, is placed throughout the distribution or manufacturing facility to receive signals transmitted from the identification devices. The signals are then passed to a central control system that monitors and records the applicable information. The central control system can also send information to its interrogation readers to send to the transponders for response and/or to be stored in the transponder's memory.

The identification system also allows for statistical analysis of the materials to maintain an accurate inventory, production flow rates, and other production standards. Additionally, the identification devices may include specific information about the materials housed within the containers including date of manufacture, place of manufacture, type of product within the container, the temperature of the container and the ambient air, the temperature of the contents of the container, the pressure of the container, etc.

A problem occurs when the containers are not conducive for mounting an identification device or transponder. One example is a beer keg that has a substantially cylindrical shape with smooth, uniform outer walls. There are no extensions or areas for effectively attaching the identification device. Additionally, these containers may be heavy and cumbersome to handle. During the filling process and distribution, the containers may bang against other containers, storage racks, conveyor equipment, etc. An identification device attached to the container may easily be damaged or destroyed during this process.

Another concern is the identification devices should be able to be quickly mounted to the containers. Each container should be identified with a separate identification device. The labor cost would be excessive and outweigh the benefits of the identification system if each device was timely to mount to the containers. Therefore, it is important that the identification devices can be quickly attached to each of the individual devices. Inherent with the quick attachment, the devices should be mounted in a straight-forward manner that is not overly difficult to require specialized equipment, or highly-trained technicians for the attachment process.

In addition to be quickly attached, the identification tags should also securely attach to the containers. Secure attachment should prevent the tags from inadvertently falling off the containers even during handling of the containers during which they may be dropped, bounced around, or otherwise roughly handled.

It is also important that the identification tags be attached in an inconspicuous manner. For reusable containers that are sent to the consumers and then returned to be refilled and redistributed, an inconspicuous placement will help to ensure that the consumers do not tamper with or otherwise destroy the identification tag. An inconspicuous placement, such as within the enclosed rim of a keg, may also help to shield the identification tag from damage while being handled.

SUMMARY OF THE INVENTION

The present invention is directed to an identification device that is mounted to and identifies a container. The device includes a wireless communication device having a mounting structure. The mounting structure has a first orientation with a first, reduced orientation, and a second enlarged orientation for securely positioning the wireless communication device within the container.

The mounting structure may have a variety of embodiments depending upon the specific application. One embodiment includes deployable arms attached to the wireless communication device that deploy out for mounting and protection. Another embodiment features an expandable foam coating positioned around the wireless communication device and being likewise deployable to an enlarged orientation.

The invention may be used on a variety of containers and positions on the containers. One container embodiment features a chamber positioned within an interior section of the container, and an access opening that extends into the chamber. The size of the access opening is smaller than the size of the chamber such that once the mounting structure is deployed, it is contained within the chamber. Another embodiment features an enclosed section of the container that in which the mounting unit is placed, and upon expansion, holds the identification device in position.

The identification device is mounted within the container in the first, non-deployed position. In the first embodiment, the wireless communication device with mounting unit is placed into the access aperture or other like opening. Once the device is placed within the chamber, the mounting unit is deployed to maintain the device and prevent it from falling out or being damaged. In the second embodiment, the identification is held or otherwise positioned in the enclosed area and then the mounting unit is deployed.

The invention further includes an interrogation reader than communicates with the identification device. When the identification device moves within range of the interrogation reader, information regarding the container and contents of the container are transferred and/or updated. Additionally, a central control system may be in communication with the interrogation reader for overseeing the containers.

DETAILED DESCRIPTION OF THE INVENTION

Figure 1:
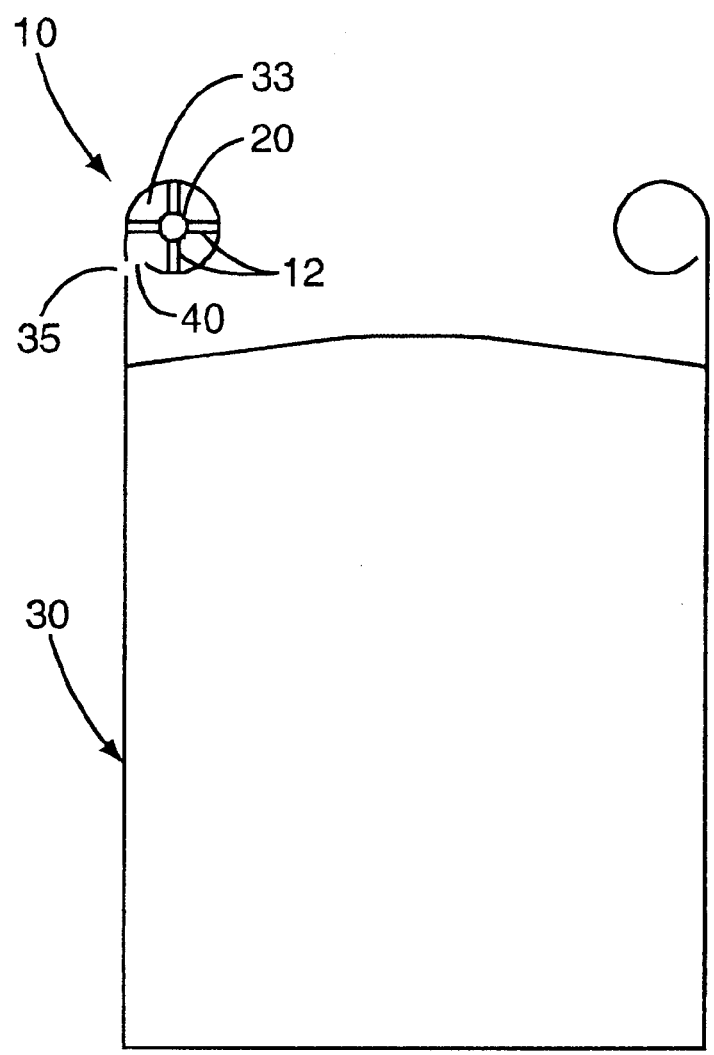
FIG. 1 is a sectional side view of a wireless communication device with attached mounting unit in a deployed position within a chamber of a container.

Referring now to the drawings in general in FIG. 1 in particular, it will be understood that the illustrations are for the purpose of describing a preferred embodiment of the invention and are not intended to limit the invention thereto. As illustrated in FIG. 1, the wireless communication device with mounting unit, generally designated 10, is shown constructed according to the present invention. The invention includes the wireless communication device 20 surrounded by a mounting unit 12. FIG. 1 illustrates the mounting unit 12 in a deployed position locating the wireless communication device 20 within a chamber 33 of container 30.

Figure 2:
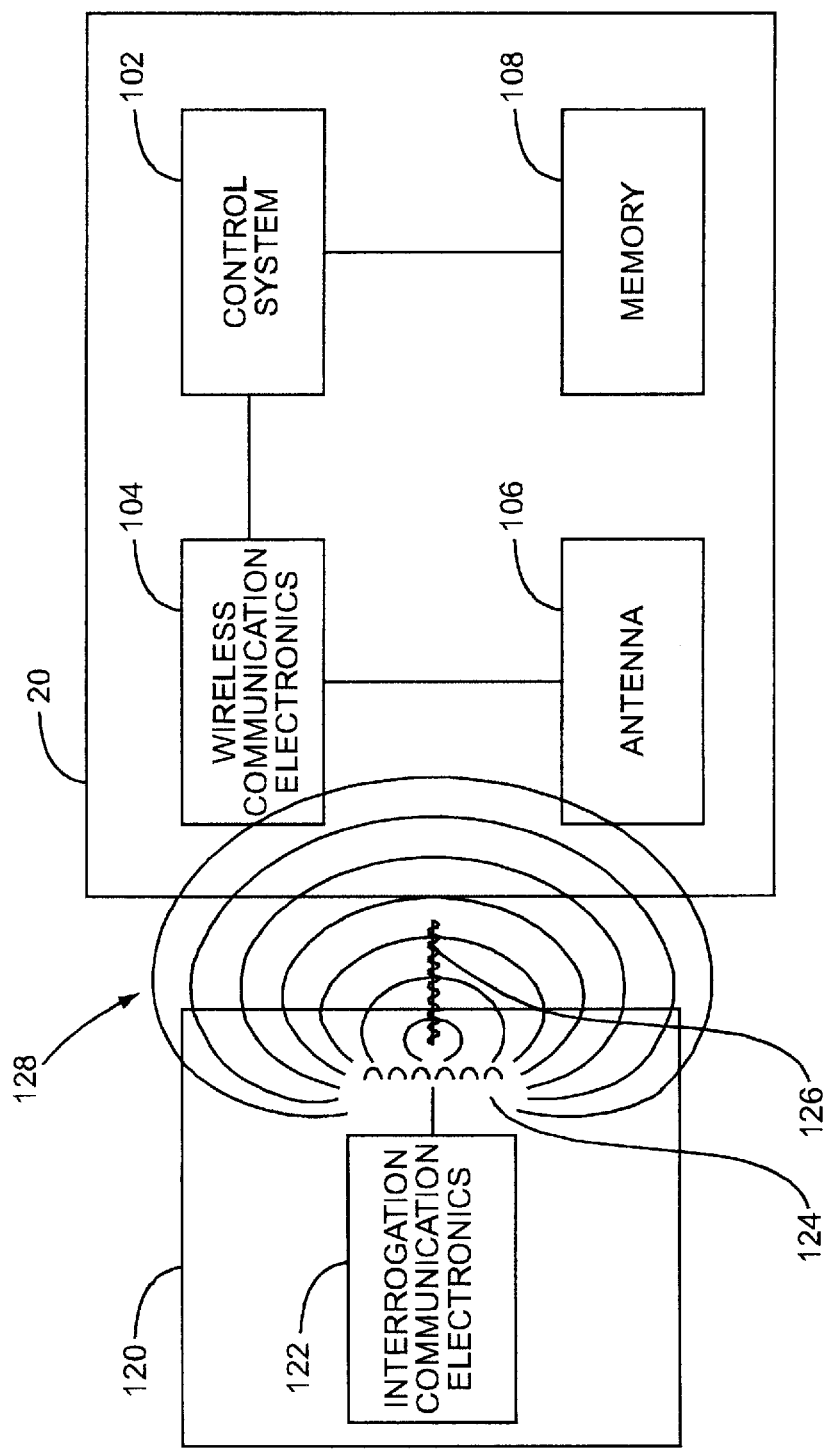
FIG. 2 is schematic diagram illustrating the communication between the wireless communication device and an interrogation reader.

FIG. 2 illustrates one particular type of wireless communication device 20 called a radio frequency transponder. One of ordinary skill in the art will understand that there are many other different types of wireless identification devices 20 that allow electronic communication and the present invention is not limited to any one particular type. The transponder 20 is usually made out of some type of plastic or other material having within it control system 102, wireless communication electronics 104, antenna 106, and memory 108. The antenna 106 may be either external or incorporated internal to the transponder 20.

The control system 102 is an integrated circuit or other type of microprocessor or micro-controller electronics that controls the substantive operations of the transponder 20. The control system 102 is connected to the wireless communication electronics 104 to communicate and receive transmissions. The control system 102 is also connected to memory 108 for storing information and retrieving information.

FIG. 2 also depicts how communication is achieved with the transponder 20. An interrogation reader 120 contains interrogation communication electronics 122 and an interrogation antenna 124. The interrogation reader 120 communicates to the transponder 20 by emitting an electronic signal or command modulated in a frequency 126 through the interrogation antenna 124. The interrogation antenna 124 may be any type of antenna that can radiate the modulated signal 126 through a field 128 so that a compatible device such as a transponder 20 can receive such signal 126 through its own antenna 106. The field 128 could be any of a variety of different types used in electronic communications including electromagnetic, magnetic, or electric. The signal 126 is a message containing information and/or specific instructions for the transponder 20.

When the transponder antenna 106 is in the presence of the field 128 emitted by the interrogation reader antenna 124, the wireless communication electronics 104 are energized thereby energizing the transponder 20. The transponder 20 remains energized so long as its antenna 106 is in the field 128 of the interrogation reader 120. The wireless communication electronics 104 demodulate the signal 126 and send the message containing information and/or specific instructions to the control system 102 for appropriate actions. For example, the request in the message may be for the transponder 20 to send back information about the materials housed within the container 30 including date of manufacture, place of manufacture, and type of product within the container. The message may also be instructions to send back information regarding the temperature of the container, its ambient air, the temperature of the contents of the container, the pressure of the container, etc. The transponder 20 sends back information to the interrogation reader 120 by altering the contents of the signal 126.

Alternative forms exist for communicating with a wireless electronic device such as a transponder 20. For instance, the transponder 20 may have a transmitter so that it can send information to the interrogation reader without having to use the signal 126 as the means for communication. The transponder 20 may contain a battery to power the transmitter, or an energy storage unit that is charged by the energy when the transponder is in the field 128 of the signal 126. It is understood to one of ordinary skill in the art there are many other manners in which to communicate with a wireless identification device such as a transponder 20, and that the present invention is not limited to the particular manner described above.

Figure 3:
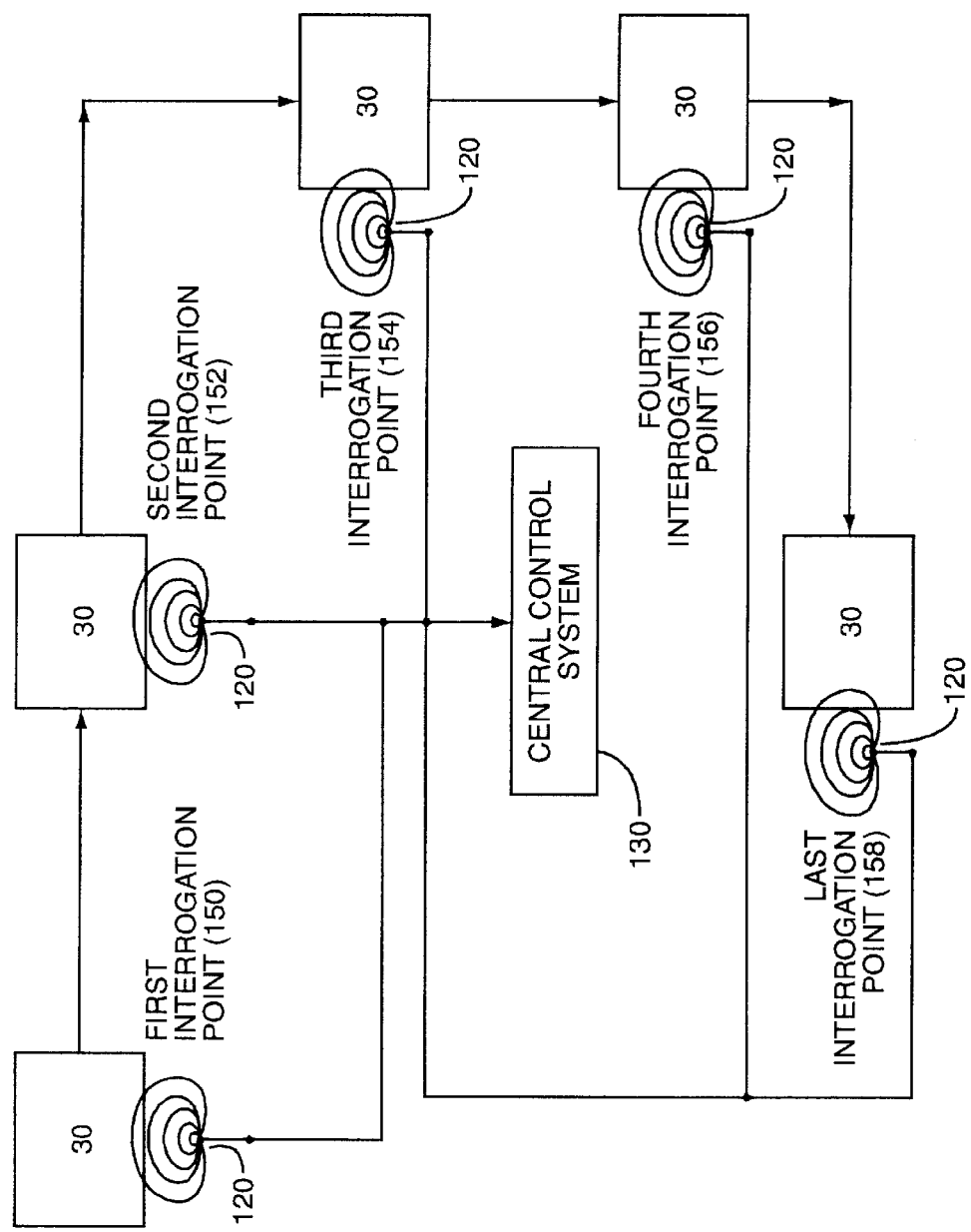
FIG. 3 is a schematic diagram illustrating the tracking and information system for the wireless communication device.

FIG. 3 illustrates a tracking system in which containers 30 containing transponders 20 can be tracked through an environment such as factory or distribution facility. For example, the transponder 20 connected to container 30 could pass a first interrogation point 150 that includes an interrogation reader 120. When the container 30 and its transponder 20 is in the presence of the interrogation reader 120 as described previously, a message containing information and/or a specific request for information may be transmitted by the interrogation reader 120 and received by the transponder 20. This process continues as the container 30 moves to a second interrogation point 152, a third interrogation point 154, a fourth interrogation point 156, and on to a last interrogation point 158.

A central control system 130 maintains the information from the interrogation readers 120 and monitors the movement of the containers 30 through the facility. The information received by each of the interrogation readers 120 may be forwarded to the central control system 130 either through direct wire or LAN connection. The central control system 130 could also send information to the interrogation reader 120 to be transmitted to the transponder 20 for identification purposes. The central control system 130 tracks the expected location of the containers 30 and may be alerted if it expects to receive information about a particular container and does not.

During commissioning of each container 30, it may be necessary to place the container 30 containing the transponder 20 in range of an interrogation reader 120 in order to erase previously stored information in memory 108 or to store particular data or configuration information about the container 30 in memory 108 for later use.

A separate wireless communication device 20 is preferably mounted on each container 30. A mounting unit 12 functions to mount the wireless communication device 20 to the container 30. In one embodiment, the mounting unit 12 is selectively positionable from a first orientation sized to fit into an opening in the container to a second, enlarged orientation sized to expand into the dimensions of the chamber 33. Preferably, once the mounting unit 12 has been expanded into the second orientation it will not return to the smaller, first orientation. This maintains the positioning of the wireless communication device 20 and prevents the device from inadvertently being removed from the container 30.

Figure 4A:
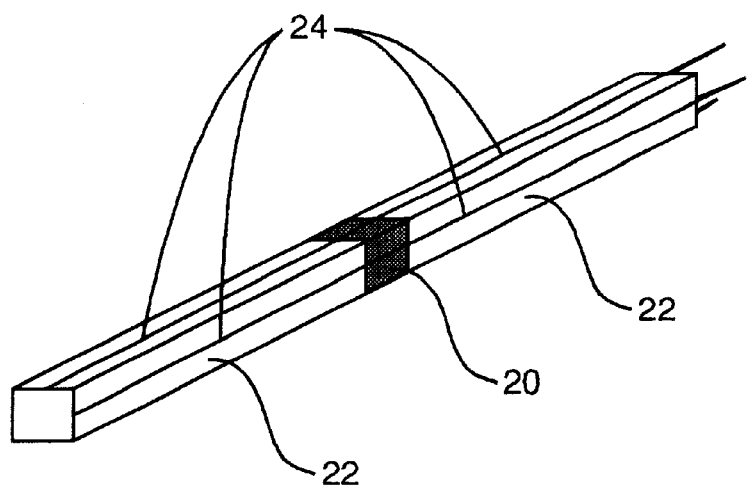
FIG. 4A is a perspective view of the wireless communication device with attached mounting unit in a non-deployed orientation.
Figure 4B:
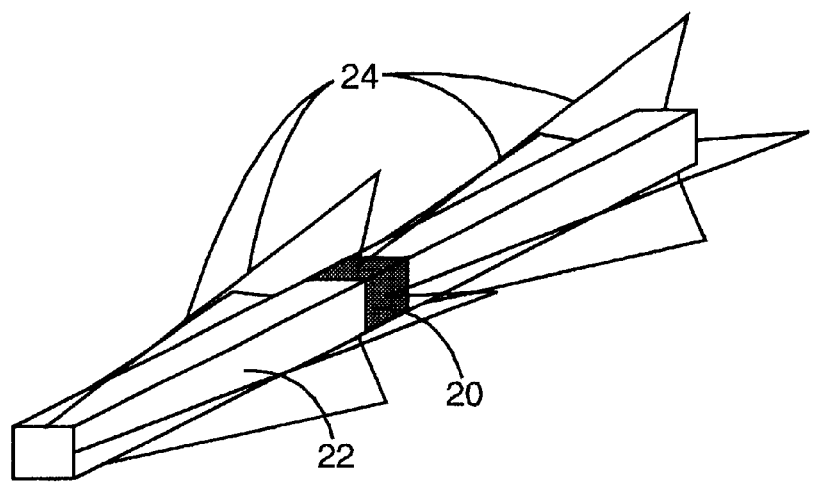
FIG. 4B is a perspective view of the wireless communication device of FIG. 4A with the mounting unit in a deployed orientation.

FIG. 4A illustrates the identification device 10 in a first, non-deployed orientation. This embodiment features the wireless communication device 20, such as an integrated circuit, connected to a dipole antenna 22. Preferably, the antenna 22 is flexible allowing for insertion into a variety of containers. In the first orientation, arms 24 are positioned against or in close alignment with the antennas 22 giving a reduced profile for insertion into the access opening. Preferably, the arms 24 are flexible to further ease the insertion process, such as springs. The arms 24 may be angled in one direction such that forcing the device through the access opening for insertion into the access opening causes the arms 24 to fold down against the device 20 and reduce the cross sectional size. FIG. 4B illustrates the deployed, second orientation in which the arms 24 extend outward from the antennas 22 for positioning within the chamber 33. When the device 20 is inside the container 30, the arms 24 expand, thereby locking the device in position. Attempts to pull the device 20 back through the access opening will not cause the arms 24 to collapse, thereby preventing removal.

Preferably, the arms 24 extend from the antennas 22 at a variety of angles for securely mounting the wireless communication device within the chamber 33. As illustrated in FIGS. 1 and 4B, arms 24 extend from four sides of the antennas 22. Another embodiment includes the arms 24 being helical springs. The cross sectional size of the arms 24 decreases when the springs are pulled apart and elongated to insert the device 20 into the container 30. When the force is removed, the spring recoils to a second orientation, having a larger cross sectional shape. However various orientations of arm positioning and designs are available and contemplated by the present invention.

Figure 5A:
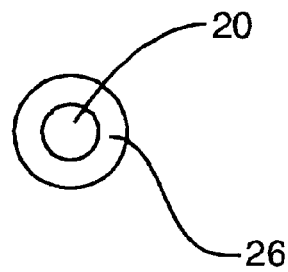
FIG. 5A is a side view of an alternative embodiment of a wireless communication device with a mounting coating.
Figure 5B:
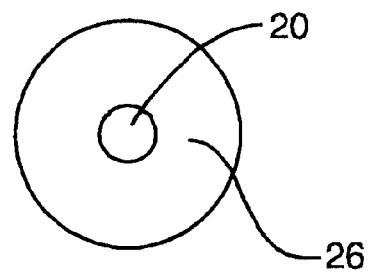
FIG. 5B is a side view of the alternative embodiment illustrated in FIG. 5A having the mounting coating in a deployed position.

FIGS. 5A and 5B illustrate another embodiment of the mounting device of the present invention. A coating 26 surrounds the wireless communication device 20. Preferably, the coating 26 completely surrounds the device 20, although it may only cover a portion depending upon the application. The coating 26 is deployable to a second orientation having a larger cross-sectional width to position the wireless communication device 20 in the chamber.

Figure 6:
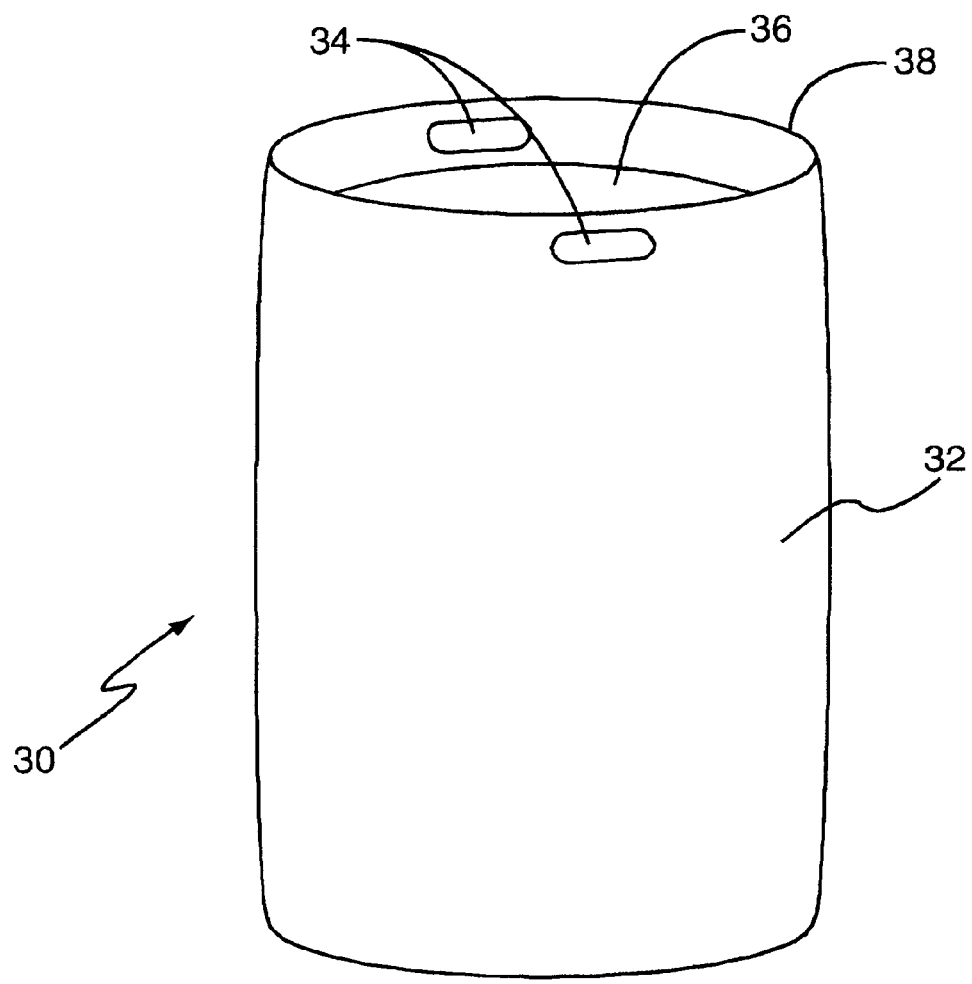
FIG. 6 is a perspective view of one of the container embodiments.

The container 30 may have a variety of shapes and sizes. FIG. 6 illustrates one embodiment of a container 30 having a main body 32 for holding materials. A rim 38 extends outward from the top surface 36 and includes handles 34 for grasping and carrying the container. As illustrated in FIG. 1, the rim 38 may further have a curled upper end having an opening 40. A chamber 33 is formed by the rim 38 and extends around the upper container edge. A drain hole 35 may be positioned within the lip 38 and extend into the chamber 33. The drain hole 35 provides for removing liquid that may congregate in the chamber, and also provides one route of access for mounting the identification device 10. In one embodiment, the container 30 is a beer keg, although one skilled in the art will appreciate that the present invention is applicable to a wide variety of container shapes and sizes.

The width of the access opening into the chamber 33, such as the drain hole 35 or opening 40, is smaller than the width of the chamber 33. This requires that the non-deployed identification device 10 have a maximum width sized to fit within the access opening. Once inside the chamber 33 and the mounting unit 12 is deployed, the size is larger than the access opening to prevent the identification device 10 from inadvertently exiting. The chamber 33 may have a number of openings or access points for insertion of the identification device.

The identification device 10 may be inserted and deployed into the chamber 33 in a variety of manners. Using the container as illustrated in FIGS. 1 and 4, the identification device 10 with attached mounting unit 12 is initially oriented in a nondeployed orientation. The device 10 is inserted into the access opening such as the drain hole 35 or opening 40. Insertion may be performed manually by a user either via their hands, or a simple insertion instrument. By way of example, a tube may be used with one end inserted into the access opening. The device is then inserted into the opposite tube end and funneled into the container. Once the identification device 10 is positioned within the chamber 33, the mounting unit 12 may be deployed to the expanded, second orientation. Deployment may be initiated by such methods as allowing the arms to re-expand once the device is through the access opening. Another embodiment features a sheath or like restraining band that holds the device within the first, smaller orientation. Once within the access opening, the restraining device is removed, cut open, dissolved resulting in the unit obtaining the second, enlarged orientation. The deployed orientation allows for the identification device 10 to be protected within the chamber 33. This orientation also prevents the device from inadvertently exiting the chamber as the deployed position is larger than the apertures leading into the chamber. Preferably, the deployed position also positions the identification device 10 in a central portion of the chamber to increase transmitted signals strength.

The identification device 10 may also be mounted to other areas of a container 30. Suitable locations include partially enclosed areas in which the non-expanded device may be placed and then held in position once expanded. By way of example, the mounting device may be placed in the access opening and expanded without being positioned completely within the chamber 33.

In the foregoing description, like-reference characters designate like or corresponding parts throughout the several views. Also, it is to be understood that such terms as "forward", "rearward", "left", "right", "upwardly", "downwardly", and the like are words of convenience that are not to be construed as limiting terms. Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. An identification device attached onto a container that communicates with an interrogation reader, comprising:
   a container;
   a wireless communication device that is capable of conducting communication with the interrogation reader; and
   a mounting structure positioned around said wireless communication device having a first orientation before attaching said mounting structure to the container and a second expanded orientation after attaching said mounting structure to the container.

2. The device of claim 1, wherein said mounting structure second orientation has a greater width than said first orientation width.

3. The device of claim 1, wherein said second orientation has a larger cross sectional area than said first orientation.

4. The device of claim 1, wherein said mounting structure is an expandable foam coating positioned around said wireless communication device.

5. The identification device of claim 1 wherein said mounting structure is an expandable foam coating positioned around said wireless communication device and wherein an activator expands said foam from said first orientation to said second orientation.

6. An identification device comprising:
a wireless communication device; and
a mounting structure positioned around said wireless communication device having a first orientation and a second expanded orientation;
wherein said mounting structure is an expandable foam coating positioned around said wireless communication device; and
wherein said expandable foam expands to said second orientation when heated above a predetermined temperature.

7. The device of claim 1, further including a plurality of springs positioned along said wireless communication device, said plurality of springs being expandable from a first position substantially in contact with said wireless communication device to a second position distanced away from said wireless communication device.

8. The device of claim 7, wherein said wireless communication device includes an integrated circuit with a dipole antenna, said plurality of springs being attached said dipole antenna.

9. The device of claim 1, wherein said wireless communication device includes a memory.

10. An identification device attached onto a container that communicates with an interrogation reader, comprising:
a container;
a wireless communication device that is capable of conducting communication with the interrogation reader;
a mounting structure attached to said wireless communication device having a first orientation sized to fit through the container opening before attachment of said mounting structure to the container and a second, expanded orientation larger than the container opening after being attached to the container.

11. An identification device comprising:
a container having (i) a chamber; and (ii) an access opening within an outer surface of said container and in communication with said chamber;
a wireless communication device for identifying said container; and
a mounting unit attached to said wireless communication device having a first orientation in which said wireless communication device and said mounting unit are sized to fit through said access opening and a second expanded orientation larger than said access opening.

12. The device of claim 11, wherein said chamber is positioned within a handle of said container.

13. The device of claim 11, wherein said container is a beer keg.

14. The device of claim 11, wherein said chamber includes a plurality of openings.

15. An identification device attached onto a container that is capable of conducting communication with an interrogation reader, comprising:
a container;
a wireless communication device that is capable of conducting communication with the interrogation reader;
a mounting structure containing said wireless communication device; and
means for expanding said mounting structure after said mounting structure is attached to the container.

16. A method of mounting an identification device that is capable of conducting communication with an interrogation reader to a container comprising the steps of:
positioning an identification device that is capable of conducting communication with the interrogation reader and that has a mounting unit to the container; and
thereafter, expanding the mounting unit to attach the identification device to the container.

17. The method of claim 16, wherein the identification unit is centered within the mounting unit when expanded.

18. The method of claim 16, wherein the mounting unit is inserted through an access opening prior to expansion.

19. The method of claim 18, further including expanding the mounting unit when the identification device is positioned within a chamber in the container.

20. The method of claim 19, wherein the identification device is centered within the chamber after the mounting unit has been deployed.

21. A method of monitoring a container comprising the steps of:
placing an identification device into a mounting unit;
inserting said mounting unit within an enclosed portion of the container;
expanding said mounting unit attached to said identification device to a second, enlarge orientation to attach said mounting unit to the container;
moving the container through at least one interrogation point containing an interrogation reader; and
establishing communication between the identification device and the interrogation reader for monitoring the container.

22. The method of claim 21, further including a central control system in communication with the interrogation point for monitoring the movement of the container.

23. The method of claim 21, wherein said identification device includes a memory for storing information regarding the container, and the identification device communicates the information to the interrogation point.

24. The method of claim 23, wherein the interrogation point delivers information to the identification device which is stored in the memory.

25. The device of claim 4, wherein an activator expands said foam from said first orientation to said second orientation.

26. The device of claim 4, wherein said expandable foam expands to said second orientation when heated above a predetermined temperature.

* * * * *